US006921793B2

(12) United States Patent
Hall et al.

(10) Patent No.: US 6,921,793 B2
(45) Date of Patent: Jul. 26, 2005

(54) RUBBER COMPOSITIONS AND VULCANIZATES INCLUDING COMB-BRANCHED POLYMERS

(75) Inventors: James E. Hall, Mogadore, OH (US); Peyman Pakdel, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/343,420

(22) PCT Filed: Aug. 16, 2001

(86) PCT No.: PCT/US01/25660

§ 371 (c)(1),
(2), (4) Date: Jun. 9, 2003

(87) PCT Pub. No.: WO02/16491

PCT Pub. Date: Feb. 28, 2002

(65) Prior Publication Data

US 2004/0010085 A1 Jan. 15, 2004

Related U.S. Application Data

(60) Provisional application No. 60/226,421, filed on Aug. 18, 2000, now abandoned.

(51) Int. Cl.[7] .................... C08F 293/00; C08F 297/02; C08L 21/00

(52) U.S. Cl. .................. 525/236; 525/271; 525/250; 525/314; 525/316; 525/331.9; 525/355; 525/342

(58) Field of Search ............... 525/236, 271, 525/250, 314, 316, 331.9, 355, 342

(56) References Cited

U.S. PATENT DOCUMENTS

| | | | | |
|---|---|---|---|---|
| 3,652,516 A | * | 3/1972 | Farrar ................... | 526/173 |
| 4,362,840 A | | 12/1982 | Tabar et al. ............ | 524/525 |
| 4,399,239 A | | 8/1983 | Herwig et al. .......... | 521/137 |
| 4,481,995 A | | 11/1984 | Ogawa et al. .......... | 152/356 |
| 5,008,324 A | | 4/1991 | Killgoar, Jr. et al. ... | 524/504 |
| 5,225,498 A | | 7/1993 | Sorathia et al. ........ | 525/454 |
| 5,254,628 A | * | 10/1993 | Lawson et al. ......... | 525/237 |
| 5,578,680 A | | 11/1996 | Ando et al. ............ | 525/131 |
| 5,670,006 A | | 9/1997 | Wilfong et al. ......... | 156/236 |
| 5,733,965 A | | 3/1998 | Scholl et al. .......... | 524/513 |
| 5,780,551 A | * | 7/1998 | Engel et al. ........... | 525/236 |
| 5,905,116 A | | 5/1999 | Wang et al. ............ | 525/74 |
| 5,910,530 A | | 6/1999 | Wang et al. ............ | 524/534 |
| 5,923,296 A | | 7/1999 | Sanzgiri et al. ........ | 343/700 |
| 5,994,468 A | | 11/1999 | Wang et al. ............ | 525/178 |
| 6,133,354 A | | 10/2000 | Wang et al. ............ | 524/268 |
| 6,184,292 B1 | | 2/2001 | Hall et al. ............. | 525/185 |
| 6,191,197 B1 | | 2/2001 | Wang et al. ............ | 524/71 |
| 6,191,217 B1 | | 2/2001 | Wang et al. ............ | 525/70 |
| 6,194,485 B1 | | 2/2001 | Hogan et al. .......... | 523/166 |
| 6,251,994 B1 | | 6/2001 | Wang et al. ............ | 525/127 |
| 6,268,427 B1 | | 7/2001 | Wang et al. ............ | 524/504 |
| 6,407,166 B1 | | 6/2002 | Wang et al. ............ | 525/66 |

FOREIGN PATENT DOCUMENTS

| | | |
|---|---|---|
| EP | 0 573 893 | 6/1993 |
| EP | 0 585 012 | 8/1993 |
| EP | 0 573 893 | 9/1993 |
| EP | 0 924 225 | 11/1998 |
| EP | 0 955 316 | 4/1999 |
| EP | 0 955 317 | 4/1999 |
| EP | 0 955 319 | 4/1999 |
| EP | 0 955 320 | 4/1999 |
| EP | 0 955 329 | 4/1999 |
| EP | 0 964 006 | 6/1999 |
| EP | 0 964 022 | 6/1999 |
| GB | 2354243 | 3/2001 |

OTHER PUBLICATIONS

"Scaling Concepts in Polymer Physics" by de Gennes, Cornell University Press, Ithaca, New York, pp. 140–143, 1979.
"Gelation and Critical Phenomena" by Stauffer et al., Advances in Polymer Science 44, pp. 103–153, 1982.
"Frequency Dependence of Viscoelastic Properties of Branched Polymers Near Gelation Threshold" by Durand et al., Europhys. Lett. 3 (3), pp. 297–300, 1987.
"Wet Skid Properties of Filled Rubbers and the Rubber–Glass Transition" by Heinrich et al., Rubber Chemistry and Technology, vol. 71, pp. 53–61, 1998.
"Preparation and Characterization of Some Star– and Comb–Type Branched Polystyrenes" by Altares et al., Journal of Polymer Science: Part A, vol. 3, pp. 4131–4151, 1965.
"Stopping of Crosslinking Reaction in a PDMS Polymer at the Gel Point" by Chambon et al., Polymer Bulletin, 13, pp. 499–503 (1985).
"Mesoscopic Pictures of the Sol–Gel Transition: Ladder Models and Fractal Networks" by Schiessel et al., Macromolecules 28, pp. 4013–4019 (1995).
"Synthesis of Branched and Hyperbranched Polystyrenes" by Gaynor et al., Macromolecules, 29, pp. 1079–1081, (1996).
"Relaxation Patterns of Nearly Critical Gels" by Mours et al., Macromolecules 29, pp. 7221–7229 (1996).
"Relationship Between Viscoelastic Properties and Gelation in Thermosetting Systems" by Tung et al., Journal of Applied Polymer Science, vol. 27, pp. 569–574 (1982).
"Rheology of Polymers Near Liquid–Solid Transitions" by Winter et al., Advances in Polymer Science, vol 134, pp. 165–193 (1997).

* cited by examiner

Primary Examiner—James J. Seidleck
Assistant Examiner—Olga Asinovsky
(74) Attorney, Agent, or Firm—Arthur Reginelli; Meredith E. Palmer

(57) ABSTRACT

A vulcanizate comprising a rubber, and a damping component that is prepared by preparing a mixture of living polymers that include living polymers with at least two living ends and living polymers with one living end to form a mixture of living polymers, and coupling the mixture of living polymers with a coupling agent that has at least three reactive functionalities.

21 Claims, 2 Drawing Sheets ly represented by the formula $G^*=G'+iG''$ where $G^*$ is the

RUBBER COMPOSITIONS AND VULCANIZATES INCLUDING COMB-BRANCHED POLYMERS

This application gains priority from International Application No. PCT/US01/25660, filed on Aug. 16, 2001, which gains priority from U.S. Patent Application No. 60/226,421, filed on Aug. 18, 2000, now abandoned.

BACKGROUND OF THE INVENTION

Damping is the absorption of energy, such as vibrational or sound energy, by a material in contact with the source of that energy. Damping vibrational energy from a number of sources such as motors and engines can be desirable.

Viscoelastic materials are often employed for damping applications. Energy is absorbed by the viscoelastic material and converted into heat. Ideally, viscoelastic materials employed for damping are effective over a wide range of temperatures and frequencies.

The viscoelastic nature of materials can be mathematically represented by the formula $G^*=G'+iG''$ where $G^*$ is the complex shear modulus, $G'$ is the elastic or storage modulus, $G''$ is the viscous or loss modulus, and $i=\sqrt{-1}$. The damping effectiveness of viscoelastic materials can be quantified by measuring viscoelastic response to a periodic stress or strain. Results of dynamic mechanical tests are generally given in terms of $G'$ and $G''$, where $G''$ is directly related to the amount of mechanical energy converted to heat, i.e., damping.

The ratio of $G''$ to $G'$ is often referred to as tan $\delta$, $$\tan\delta = \frac{G''}{G'}$$

which quantifies a material's ability to dissipate mechanical energy versus the purely elastic storage of mechanical motion during one cycle of oscillatory movement. Tan $\delta$ can be measured by a dynamic analyzer, which can sweep many frequencies at a fixed temperature, then repeat that sweep at several other temperatures, followed by the development of a master curve of tan $\delta$ versus frequency by curve alignment. An alternate method measures tan $\delta$ at constant frequency over a temperature range.

In common practice, the tan $\delta$ of a material is usually broadened by taking advantage of the glass transition temperature of several materials within a temperature range. Enhancing hysteresis (tan $\delta$) by using superposition of glass transition peaks is not desirable because the modulus of the material drops dramatically at or about the glass transition temperature.

Although numerous compositions are known for damping, there is a need for improved damping compositions that exhibit a high degree of damping over a wide range of temperatures and frequencies without involving glass transition peaks.

SUMMARY OF THE INVENTION

In general the present invention provides a vulcanizate comprising a rubber, and a damping component that is prepared by preparing a mixture of living polymers that includes, living polymers with at least two living ends per polymer chain and living polymers with one living end and coupling the mixture of living polymers with a coupling agent that has at least three reactive functionalities.

The present invention also includes a method for making a damping component comprising preparing a mixture of living polymers that includes living polymers with at least two living ends per polymer chain and living polymers with one living end per polymer chain and coupling the mixture of living polymers with a coupling agent that has at least three reactive functionalities.

The compositions of the present invention advantageously exhibit a high degree of damping, as represented by high tan $\delta$, over a wide temperature range without relying on glass transition peaks. As a result, superior damping is achieved across a wide temperature range without a deleterious loss in modulus.

DETAILED DESCRIPTION OF ILLUSTRATIVE EMBODIMENTS

The rubber compositions and vulcanizates of this invention have improved damping characteristics because they contain certain polymeric materials which may also be referred to as "damping materials" that have a high tan $\delta$ over a wide temperature and frequency range. Furthermore, these damping materials are viscoelastic and preferably miscible with elastomeric materials.

Figure 1:
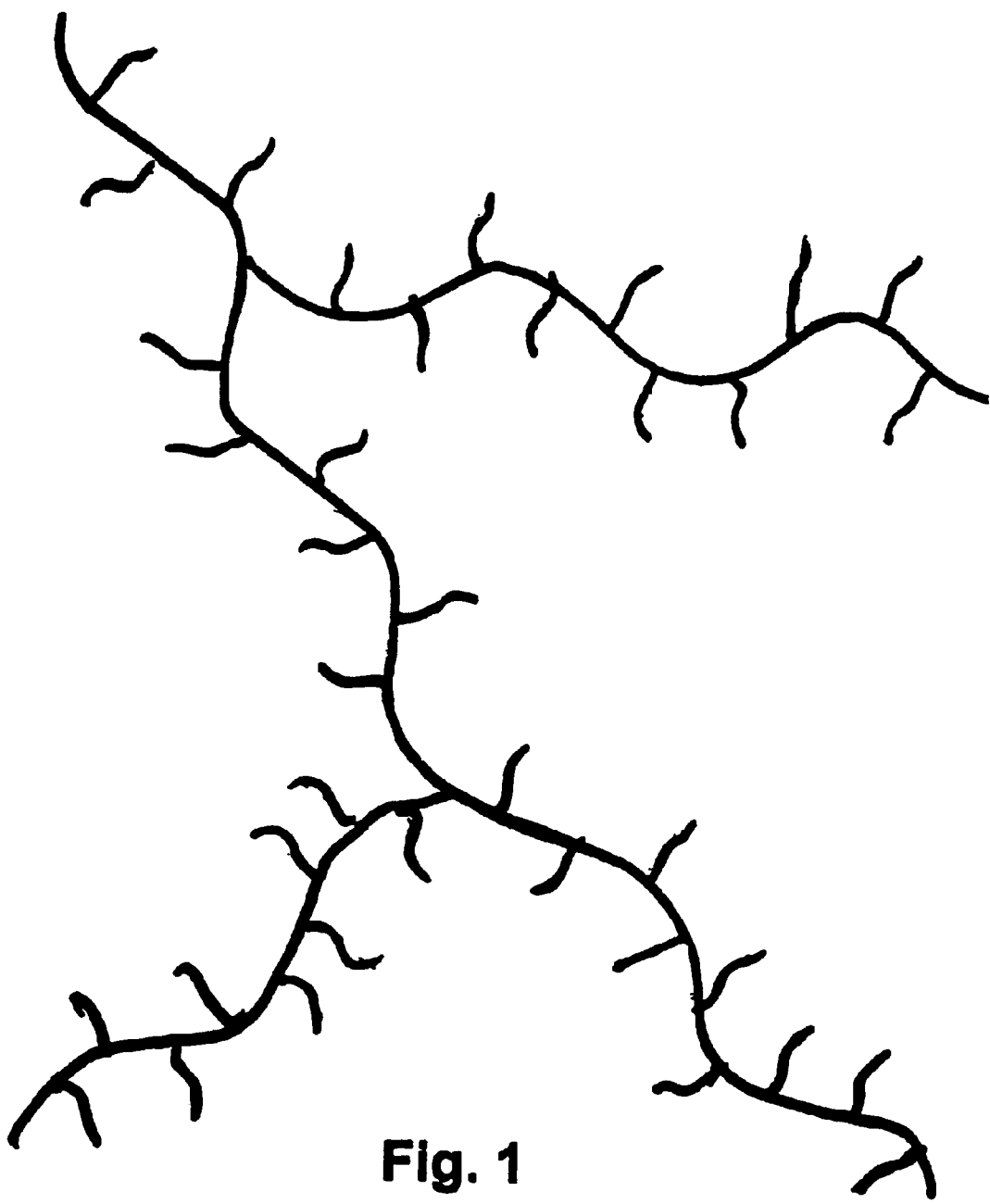
FIG. 1 is a schematic drawing of a comb-branched polymer.

The damping materials include comb-branched polymers, which are complex and highly branched macromolecular structures. Their exact structure, however, cannot be defined with any great degree of certainty. In general, however, their structure is a distribution of polymers having a general topology as illustrated in FIG. 1, i.e., they are characterized by long-chain branches with smaller side-chains extending from the longer chains.

The comb-branched polymers are prepared by preparing a mixture of living polymers including living polymers with at least two living ends (DiLi macromonomer) and living polymers with one living end (Li macromonomer), and coupling this mixture of living polymers with a coupling agent that has at least three reactive functionalities. This coupling reaction preferably takes place within an organic solvent. The main control parameters in synthesizing this class of polymers are the molecular weights of the Li and DiLi macromonomers. During the coupling reaction, the Li macromonomers are coupled to the macromolecule and form the smaller side-chains, and the DiLi macromonomers are coupled to form the longer branches.

The preferred molecular weight of the DiLi and Li macromonomers is best described in terms of their corresponding entanglement molecular weight or length. The entanglement weight or length of a polymer chain refers to a number of polymer chain repeating (or mer) units that correspond to a molecular weight sufficiently large for entanglements to occur between molecules of undiluted polymer. This length corresponds to a molecular weight where the slope of a plot of log viscosity vs. log molecular weight changes from 1.0 to 3.4; the change being associated with intermolecular entanglements. In general, the entanglement length has been defined as that length of polymer resulting from about 100 mer units. For purposes of this specification, entanglement length refers to a polymer chain length that includes a number of mer units on the order of magnitude of 100. For example, the entanglement length for polystyrene has been experimentally determined to be about 340 mer units, a number that is on the order of magnitude of 100. Additional experimental techniques for determining the entanglement length of a polymer are summarized by W. W. Graessley in ADV. POLYM. SCI., Vol. 16, 1974.

DiLi macromonomers preferably have a molecular weight from about 0.25 to about 20 times the entanglement molecular weight, more preferably from about 0.5 to about 10 times the entanglement molecular weight, and even more preferably from about 1 to about 5 times the entanglement molecular weight. The $T_g$ of the DiLi macromonomer should be less than −5° C., preferably less than −10° C., and more preferably less than −15° C.

Li macromonomers preferably have a molecular weight from about 0.25 to 10 times the entanglement molecular weight, more preferably from about 0.5 to 5 times the entanglement molecular weight, and even more preferably from about 1 to about 3 times the entanglement molecular weight. The $T_g$ of the Li macromonomer should be less than −5° C., preferably less than −10° C., and more preferably less than −15° C.

DiLi macromonomers are preferably synthesized by polymerizing monomers with a multi-functional polymerization initiators. Anionically-polymerized living polymers are formed by reacting monomers by nucleophilic initiation to form and propagate a polymeric structure. Throughout formation and propagation of the polymer, the polymeric structure is ionic or "living." A living polymer, therefore, is a polymeric segment having a living or reactive end. For example, when a lithium containing initiator is employed to initiate the formation of a polymer, the reaction produces a reactive polymer having a Li atom at its living end. This living end remains after complete polymerization so that a new batch of monomer subsequently added to the reaction can add to the existing chains and increase the degree of polymerization.

Li macromonomers are preferably synthesized by polymerizing monomers with a polymerization initiator. These polymerizations are similar to those described for the DiLi macromonomers except for the fact that the initiator is mono-functional.

For further information respecting anionic polymerization as it relates to the creation of living polymers with one or more living ends, one can refer to PRINCIPLES OF POLYMERIZATION, 3$^{RD}$ EDITION, by George Odian, John Wiley & Sons, Inc. (1991), Chapter 5, entitled *Ionic Chain Polymerization*, or Panek et al., J. AM. CHEM. SOC., 94, 8768 (1972).

Monomers that can be employed in preparing the living polymers include any monomer capable of being polymerized according to anionic polymerization techniques. These monomers include those that lead to the formation of elastomeric homopolymers or copolymers. Suitable monomers include, without limitation, conjugated $C_4$–$C_{12}$ dienes, $C_8$–$C_{18}$ monovinyl aromatic monomers, and $C_6$–$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Anionic polymerizations are typically conducted in a polar or non-polar solvent such as tetrahydrofuran (THF) or a hydrocarbon such as the various cyclic and acyclic hexanes, heptanes, octanes, pentanes, their alkylated derivatives, and mixtures thereof. To promote randomization in copolymerization and to control vinyl content, a polar coordinator may be added to the polymerization ingredients. The amount of polar coordinator employed can range between 0 and about 90 or more equivalents per equivalent of Li. The amount depends on the amount of vinyl desired, the level of comonomer employed, and the temperature of the polymerization, as well as the nature of the specific polar coordinator (modifier) employed. Suitable polymerization modifiers include, for example, ethers or amines to provide the desired microstructure and randomization.

Multi-functional lithium-containing initiators are employed to create the DiLi macromonomer. These multi-functional initiators include compounds that contain at least two alkyl-lithium, amino-lithium, or benzyl-lithium functionalities. Multi-functional magnesium-containing and sodium-containing initiators can be substituted for the alkyllithium initiators under certain conditions, and therefore reference to multi-functional initiators herein refers also to all anionic polymerization initiators that have at least two polymerization cites.

The preparation of multi-functional lithium-containing initiators is well known as described in numerous patents such as U.S. Pat. Nos. 5,750,055, 4,205,016, 4,196,154, 3,668,263, 3,663,634, and 3,652,516, which are incorporated herein by reference.

A preferred method for preparing a multi-functional lithium-containing initiator includes reacting 2 mmol of sec-butyllithium with 1 mmol of 1,3-diisopropenylbenzene in the presence of 2 moles of triethylamine. Li-alkoxides can optionally be used to promote a more equal initiation when dissimilar initiators are employed.

Mono-functional, lithium-containing initiators are employed to create the Li macromonomer. Exemplary initiators include, but are not limited to, alkyl lithium initiators such as n-butyl lithium, arenyllithium initiators, arenylsodium initiators, N-lithium dihydro-carbon amides, aminoalkyllithiums, alkyl tin lithiums, dialkyl magnesiums, alkyl magnesium halides, diaryl magnesiums, and aryl magnesium halides. Other useful initiators include N-lithiohexamethyleneimide, N-lithiopyrrolidinide, and N-lithiododecamethyleneimide, as well as organolithium compounds such as substituted aldimines, substituted ketimines, and substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, and 5,786,441.

The living polymer mixture may be prepared by several methods. In one method, the DiLi and Li macromonomers are prepared in separate solutions, and then the solutions are combined. In a second method, the DiLi and Li macromonomers can be prepared sequentially within the same solution. For example, the DiLi macromonomers can be synthesized, and then, once this synthesis is complete, the Li macromonomers can be prepared within the same solution by adding monomers and mono-functional initiators. Alternatively, the Li macromonomers can be prepared first followed by the preparation of the DiLi macromonomers.

In a third method, the living polymers can be prepared simultaneously. In this synthesis, a solution of the mono-functional, lithium-containing initiator and multi-functional lithium-containing initiator is prepared, and then monomer is added to this solution.

To the living polymer mixture is added a coupling agent having at least three reactive functionalities. Coupling agents can be added via a single charge at the completion of the polymerization of the monomers. Alternatively, they can be added in increments as two or more charges. Alternatively, coupling agents can be added continuously over a period of time, for example, five minutes to two hours. Incremental or continuous addition of the coupling agent is preferred to promote a maximum degree of coupling without overshooting the optimum level of coupling, which may cause gelation of the polymer in the reactor.

In one embodiment, the coupling agent can be defined by the formula

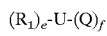

where U is tin or silicon, each $R_1$, which may be the same or different, is an alkyl having from 1 to about 20 carbon atoms, a cycloalkyl having from about 3 to about 20 carbon atoms, an aryl having from 6 to about 20 carbon atoms, or an aralkyl having from about 7 to about 20 carbon atoms, each Q, which may be the same or different, is chlorine or bromine, e is an integer from 0 to 1,f is an integer from 3 to 4, and the sum of e and f is 4. Specific examples of coupling agents that can be defined by the foregoing formula include $MeSiCl_3$, $SiCl_4$. In another embodiment, the coupling agent is tin tetrachloride or $R_2SnCl_3$, where $R_2$ is an alkyl, cycloalkyl or aralkyl having from 1 to about 12 carbon atoms, or mixtures thereof. Exemplary coupling agents of this embodiment include may tri-functional and higher coupling agents, which are well known, such as $MeSiCl_3$, trichlorotoluene, dioctylphthalate, and the like.

When employing a tri-functional coupling agent, the molar ratio of the DiLi macromonomer to the Li macromonomer to the coupling agent is preferably about 0.5–1.5:0.5–1.5:0.5–1.5 and most preferably 1:1:1.

When a tetra-functional coupling agent is employed, the molar ratio of DiLi macromonomer to the Li macromonomer to the coupling agent is preferably 0.5–1.5:1–4:0.5–1.5 and most preferably 1:2:1. As the number of reactive functionalities or the coupling agent increases, the amount of Li macromonomer in relation to the other components increases.

Preferably, the damping materials have a tan δ greater than 0.35 at temperatures from about −40° to about 120° C. In this temperature range, the tan δ of the damping materials are more preferably greater than 0.5, and even more preferably greater than 0.8. The damping materials are also preferably viscoelastic and therefore has a $T_g$ less than −5° C., more preferably less than −20° C., and even more preferably less than −30° C.

The damping materials are employed in rubber compositions or vulcanizates. More particularly, the rubber compositions and vulcanizates of this invention include from about 1 to about 500, preferably from about 5 to 300, and more preferably from 15 to about 100, parts by weight of the damping materials per 100 parts by weight rubber (phr).

The rubber to which the damping materials can be added may be referred to as a binder or matrix. The morphology of the rubber compositions and vulcanizates, however, are not limited to co-continuous phases, i.e., homogeneous blends, or discrete phases within a matrix or binder, i.e., heterogeneous blends. Preferably, the rubber compositions and vulcanizates of this invention are homogeneous to the extent that discrete phases are not visible when using light scattering techniques.

Many elastomeric materials, both natural and synthetic, can be used as the binder. These elastomers include, without limitation, natural rubber, synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, fluoroelastomers, ethylene/acrylic rubber, ethylene/vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber, polyurethane, and mixtures thereof. As used herein, the term elastomer may refer to a blend of synthetic and natural rubber, a blend of various synthetic elastomers, or simply one type of elastomer. The elastomers may also include functionalized elastomers.

Other components that may be added to the elastomeric binder or matrix include reinforcing fillers, plasticizers, antioxidants, processing aids, and dyes. Exemplary fillers include carbon black, silica, mineral fillers such as clays, including hard clays, soft clays, and chemically modified clays, mica, talc (magnesium silicate), $CaCO_3$, $TiO_2$, $Mg(OH)_2$, ground coal, ground and/or reclaimed rubber, alumina trihydrate, and mixtures thereof.

The damping materials can be blended with a rubber composition by using several techniques. For example, the damping materials may be pre-blended with the rubber composition, and then the pre-blend or masterbatch can be compounded with optional fillers, vulcanizing agents, and other rubber additives. Alternatively, the damping materials may be added directly to a rubber composition that includes at least one elastomer and other optional rubber additives including fillers and vulcanizing agents. This mixing or blending can be performed in a mill or internal mixer. Alternatively, the damping materials can be blended into the elastomeric binder while in solution. For example, the damping materials and polymeric matrix can be dissolved in a solvent and the solution subsequently blended. The solvent is then evaporated, leaving behind the elastomer-damping additive mixture.

Once the damping material is added, the elastomeric matrix may be cured or vulcanized by using conventional techniques. Conventional vulcanization typically includes the use of vulcanizing agents in an amount from about 0.5 to about 4 phr. For example, sulfur or peroxide-based curing systems may be employed. The cured elastomeric binder, which includes a damping materials and optional other additives, may be referred to as a rubber product, vulcanizate, or simply rubber. Depending on the nature of the damping material, the damping material may become incorporated into the crosslinked network of the cured elastomeric matrix.

In one embodiment, the damping material is added to a vulcanizable composition that is useful for making tire rubber. Here, the damping material is added in an amount from about 1 to about 1,000, more preferably 1 to about 300 and even more preferably about 1 to about 60, pbw phr. The addition of the damping material improves the overall traction of tire rubber including wet traction, snow traction, and dry traction. Advantageously, the wet traction of tire rubber, which predicted by hysteresis loss at 0° C., and snow traction, which is predicted by hysteresis loss at −20° C., can be improved.

Although damping materials are added to vulcanizable compositions that are useful for fabricating tire rubber, practice of this invention does not alter the type or amount of other ingredients, and therefore practice of this invention is not limited to any one vulcanizable composition of matter or tire compounding stock.

Tire formulations include an elastomer or base rubber component that is blended with reinforcing fillers and at least one vulcanizing agent. These compositions typically also include other compounding additives such as accelerators, oils, waxes, scorch inhibiting agents, and processing aids. Compositions containing synthetic rubbers typically include antidegradants, processing oils, zinc oxide, optional tackifying resins, optional reinforcing resins, optional fatty acids, optional peptizers, and optional scorch inhibiting agents.

Both synthetic and natural elastomers are employed within tire formulations. These elastomers include, without limitation, natural rubber, synthetic polyisoprene, poly (styrene-co-butadiene), polybutadiene, and poly(styrene-co-butadiene-co-isoprene).

Reinforcing agents, such as carbon black or silica, are typically employed from about 1 to about 100, preferably about 20 to about 80, and more preferably about 40 to about 80, pbw phr.

Typically, a coupling agent is added when silica is used. One coupling agent conventionally used is bis-[3 (triethoxysilyl) propyl]-tetrasulfide, which is commercially available under the tradename SI69 (Degussa, Inc.; New York, N.Y.).

Reinforced rubber compounds can be cured in a conventional manner with known vulcanizing agents. For example, sulfur or peroxide-based curing systems may be employed. For a general disclosure of suitable vulcanizing agents one can refer to Kirk-Othmer, ENCYCLOPEDIA OF CHEMICAL TECHNOLOGY, $3^{rd}$ Edition, Wiley Interscience, N.Y. 1982, Vol. 20, pp. 365–468, particularly VULCANIZATION AGENTS AND AUXILIARY MATERIALS pp. 390–402, or *Vulcanization* by A. Y. Coran, ENCYCLOPEDIA OF POLYMER SCIENCE AND ENGINEERING, $2^{nd}$ Edition, John Wiley & Sons, Inc., 1989. Vulcanizing agents may be used alone or in combination. This invention does not appreciably affect cure times. Typically, vulcanization is effected by heating the vulcanizable composition; e.g., it is heated to about 170° C.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. The damping component is preferably added during preparation of the initial masterbatch. Once this initial masterbatch is prepared, the vulcanizing agents are blended into the composition. The composition can then be manufactured into tire components by using standard construction and curing techniques. Rubber compounding and tire construction is known and disclosed in *The Compounding and Vulcanization of Rubber*, by Stevens in RUBBER TECHNOLOGY 2D EDITION (1973). Pneumatic tires can be manufactured according to U.S. Pat. Nos. 5,866,171; 5,876, 527; 5,931,211; and 5,971,046, which are incorporated herein by reference.

Tire components of this invention preferably include tire treads. The composition can also be used to form other elastomeric tire components such as subtreads, black sidewalls, body ply skims, bead fillers and the like.

In other embodiments, damping materials are added to elastomeric compositions that are useful for fabricating vibration restraining materials, which are useful as connecting materials such as sealing materials, packing, gaskets and grommets, supporting materials such as mounts, holders and insulators, and cushion materials such as stoppers, cushions, and bumpers. These materials may also be used in household electrical appliances that produce vibration or noise. For example, these materials could be used in air-conditioners, laundry machines, refrigerators, electric fans, vacuums, driers, printers and ventilator fans. Further, these materials are also suitable for impact absorbing or damping materials in audio equipment and electronic or electrical equipment. For example, these materials could be used in compact disc players including portable units and those within vehicles, video cassette recorders, radio cassette recorders, microphones, insulators for disc drives within computers, various holders for optical disc readers, microphones, or speakers including those within portable and cellular telephones. Still further, these materials are useful in sporting goods and shoes.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

EXAMPLES

Sample 1

A 32 oz. Crown-capped bottle, dried and $N_2$ flushed, was charged with hexane (50 g), 1,3-butadiene in hexane (102 g of a 28.3% solution), and 5.0 mmol of a multi-functional lithium initiator. Polymerization was allowed to proceed for three hours at room temperature, and then n-butyllithium (5.25 mmol) and 1,3-butadiene in hexane (101 g of a 28.3% solution) were then charged to the bottle. After polymerizing 16 hours at 30° C., $MeSiCl_3$ (2.0 mmol) was charged to the bottle.

Based on the charged components, the calculated $M_n$ between branches is 9,500 and the $M_n$ of the side branch is 1,900. The SEC (size exclusion chromatography) analysis gave the following: $M_n$=8,500, $M_w$=42,800, and $M_z$=291, 200 by using a polystyrene standard.

The multi-functional lithium-containing initiators employed throughout this experimental section was prepared and used within 7 days of synthesis. The initiator was prepared by reacting sec-butyl lithium (60 mmol) with 1,3-diisopropenylbenzene (30 mmol) in the presence of triethyl amine (60 mmol) within a $N_2$ purged bottle at 50° C. for 2 hours.

Sample 2

A 32 oz. Crown-capped bottle, dried and $N_2$ flushed, was charged with hexane (50 g), 1,3-butadiene in hexane (102 g of a 28.3% solution) and 6.0 mmol of a multi-functional lithium initiator. Polymerization was allowed to proceed for three hours at room temperature. n-butyllithium (7.0 mmol) and 1,3-butadiene in hexane (102 g of a 28.3% solution) were then charged to the bottle. After polymerizing 16 hours at 30° C., $MeSiCl_3$ (4.0 mmol) was charged to the bottle.

Based on the charged components, the calculated $M_n$ between branches is 7,900 and the $M_n$ of the side branch is 1,500. The SEC analysis gave the following: $M_n$=8,400, $M_w$=48,300, and $M_z$=291,200.

Sample 3

A 1-gallon stainless steel reactor was conditioned with a n-butyllithium/hexane rinse under $N_2$ purge. 1,3-butadiene in hexane (1.0 lbs of a 27.5% solution), multi-functional lithium initiator (54.4 mmol), and n-butyllithium (60 mmol) were charged to the reactor with stirring. The temperature was set to 50° C., and an exotherm resulted in a maximum temperature of 80° C. After 2 hours, a sample was taken: $M_n$=4,000, $M_w$=4,300, and $M_z$=4,700. $MeSiCl_3$ (55 mmol) was then charged to the reactor in 5 increments. By SEC, it was calculated that 97% of starting polymer was coupled by the $MeSiCl_3$, and the final product was characterized as follows: $M_n$=30,600, $M_w$=115,400, and $M_z$=520,800.

Sample 4

A 1-gallon stainless steel reactor was conditioned with a n-butyllithium/hexane rinse under $N_2$ purge. 1,3-butadiene in hexane (3.0 lbs of a 27.5% solution), styrene/hex (1.0 lb of a 33% solution), multi-functional lithium initiator (54.4 mmol), n-butyllithium (60 mmol), and 50 mmol of the chelating modifier 2,2-di(oxolanyl)propane were charged to the reactor with stirring. The temperature was set to 50° C., and an exotherm resulted in a maximum temperature of 70° C. After 2 hours, a sample was taken: $M_n$=3,800, $M_w$=4,200, and $M_z$=4,600. $MeSiCl_3$ (51.3 mmol) was charged to the reactor in 4 increments. After 30 minutes, $diphenylSiCl_2$ (7.5 mmol) was added. By SEC it was calculated that 99% of the starting polymer was coupled. Final $M_n$=20,600, $M_w$=124,900, $M_z$=575,400. By 'H NMR, the polymer contained 32.4% styrene and 62.2% of butadiene was in the form of vinyl unites. By DSC, the $T_g$=-19° C.

Samples 5–7

A 1-gallon stainless steel reactor was conditioned with a n-butyllithium/hexane rinse under $N_2$ purge. As shown in Table I, a first charge of 1,3-butadiene in hexane, styrene/hexane, modifier, and n-butyllithium were allowed to react, followed by a second charge of monomers and a multi-functional lithium initiator. When polymerization was complete, $MeSiCl_3$ was added to couple the live ends. The ingredients employed in the three samples, their addition order, and the characteristics of the resulting polymers are shown in Table I.

TABLE I

| Sample | 5 | 6 | 7 |
|---|---|---|---|
| Step 1 | | | |
| 33% STY/HEX (g) | 200 | 191 | 275 |
| 2.75 1,3 BD/HEX (g) | 908 | 908 | 1339 |
| nBuLi mmol | 82 | 82 | 92 |
| Modifier mmol | 12.0 | 12.0 | 12.0 |
| Time (hr.) | 2 | 2 | 2 |
| Temperature (°C.) | 20 | 20 | 70 |
| Step 2 | | | |
| 33% STY/HEX (g) | 182 | 191 | 76 |
| 27.5% 1,3 BD/HEX (g) | 908 | 908 | 363 |
| DiLi mmol | 39 | 71 | 80 |
| Time (hr.) | 2 | 2 | 2 |
| Temperature (°C.) | 20 | 30 | 50 |
| $M_n$ (SEC) | 3,600 | 2,900 | 700;4,700 (BIMODAL) |
| $M_w$ | 4,700 | 4,100 | 800;5,100 (BIMODAL) |
| $M_z$ | 5,400 | 4,900 | 950;5,500 (BIMODAL) |
| Step 3 | | | |
| $MeSiCl_3$ mmol | 39 | 76 | 84 |
| $SiCl_4$ mmol | 10 | 0.0 | 0.0 |
| $M_n$ (SEC) | 14,400 | 14,100 | 12,800 |
| $M_w$ | 1,535,200 | 34,600 | 34,600 |
| $M_z$ | 210,164,100 | 269,400 | 285,100 |
| Tg (°C.) (DSC) | −28 | −35 | −54 |
| % Styrene (NMR) | 23.3 | 23.8 | 22.4 |
| % 1,2 (BD = 100) | 61.6 | 58.2 | 45.0 |

Samples 8–9

A 1-gallon stainless steel reactor is conditioned with a n-butyllithium/hexane rinse under $N_2$ purge. As shown in Table II, a single charge of 1,3-butadiene in hexane, modifier, a multi-functional lithium initiator, and n-butyllithium were allowed to react. When polymerization was complete, $MeSiCl_3$ was added in four increments to couple the live ends. The ingredients employed in two samples, as well as the characteristics of the resulting polymers, are shown in Table II.

TABLE II

| Sample | 8 | 9 |
|---|---|---|
| 33% HEX (g) | 454 | 454 |
| 21.8% 1,3 BD/HEX (g) | 1544 | 1725 |
| DiLi mmol | 54.4 | 54.4 |
| nBuLi mmol | 59.2 | 57.6 |
| Modifier mmol | 32 | 30 |
| Time (hr.) | 1 | 1 |
| Temperature (°C.) | 60 | 70 |
| $MeSiCl_3$ mmol | 42 | 42 |
| $M_n$ (SEC) | 19,300 | 20,500 |
| $M_w$ | 105,700 | 71,600 |
| $M_z$ | 554,500 | 318,100 |
| Tg (°C.) (DSC) | −17 | −21 |
| % Styrene (NMR) | 34.2 | 31.1 |
| % 1,2 (BD = 100) | 62.3 | 56.1 |

Samples 10–15

The comb-branched polymer polymers of Sample 9 were compounded to form Samples 11–15, respectively. The polymers of Sample 9 have a wide molecular weight distribution, which was composed of a high molecular weight and low molecular weight portion. With an $M_n$ of 40,000 as the cut-off molecular weight, the comb-branched polymer was composed of 65% low molecular weight and 35% high molecular weight components. In Samples 11–15, the comb-branched polymer systematically replaced the matrix polymer and the SBR oil. Sample 10 was a control. The compounding recipe is set forth in Table III.

TABLE III

| Sample | 10 | 11 | 12 | 13 | 14 | 15 |
|---|---|---|---|---|---|---|
| SBR | 100 | 96 | 92 | 88 | 84 | 80 |
| SBR Oil | 35 | 29 | 23 | 17 | 11 | 5 |
| Comb-Branch Polymer | 0 | 10 | 20 | 30 | 40 | 50 |
| Carbon Black | 75 | 75 | 75 | 75 | 75 | 75 |
| Antioxidant | 1 | 1 | | 1 | 1 | 1 |
| Stearic Acid | 2 | 2 | 2 | 2 | 2 | 2 |
| Diphenylguanimide (DPG) | 0.2 | 0.2 | 0.2 | 0.2 | 0.2 | 0.2 |
| Benzothiazyl Disulfide | 0.5 | 0.5 | 0.5 | 0.5 | 0.5 | 0.5 |
| Zinc Oxide | 2 | 2 | 2 | 2 | 2 | 2 |
| Sulfur | 1.3 | 1.3 | 1.3 | 1.3 | 1.3 | 1.3 |

The SBR poly(styrene-co-butadiene) was a solution polymerized copolymer obtained under the tradename DURADENE™ (Firestone Synthetic Polymers; Akron, Ohio), and the SBR oil was a low molecular weight poly(styrene-co-butadiene) having an $M_n$ of about 10,000, which was obtained under the tradename RICON OIL 100™ (Ricon, Resins, Inc.; Grand Junction, Colo.).

An initial mixture was prepared in a 65 gram Banbury mixer operating at about 60 rpm and an initial temperature of about 80° C. First, the poly(styrene-co-butadiene), stearic acid, and antioxidant were placed in the mixer, and after about 1.5 minutes, the carbon black and the SBR oil and comb-branched polymer were added as applicable. Mixing was continued for about 15 minutes, at which time the temperature was about 110–115° C. This initial mixture was transferred to a mill operating at a temperature of about 60° C., where it was sheeted and subsequently cooled to room temperature. The final compound was mixed within a Banbury mixer operating at about 60 rpm with an initial temperature of about 75° C. The compound was removed from the mixer after about 3 minutes when the material temperature was about 105–110° C. The final compounds were sheeted, formed into shapes, and cured at about 171° C. for about 15 minutes in standard molds placed in a hot press.

Figure 2:
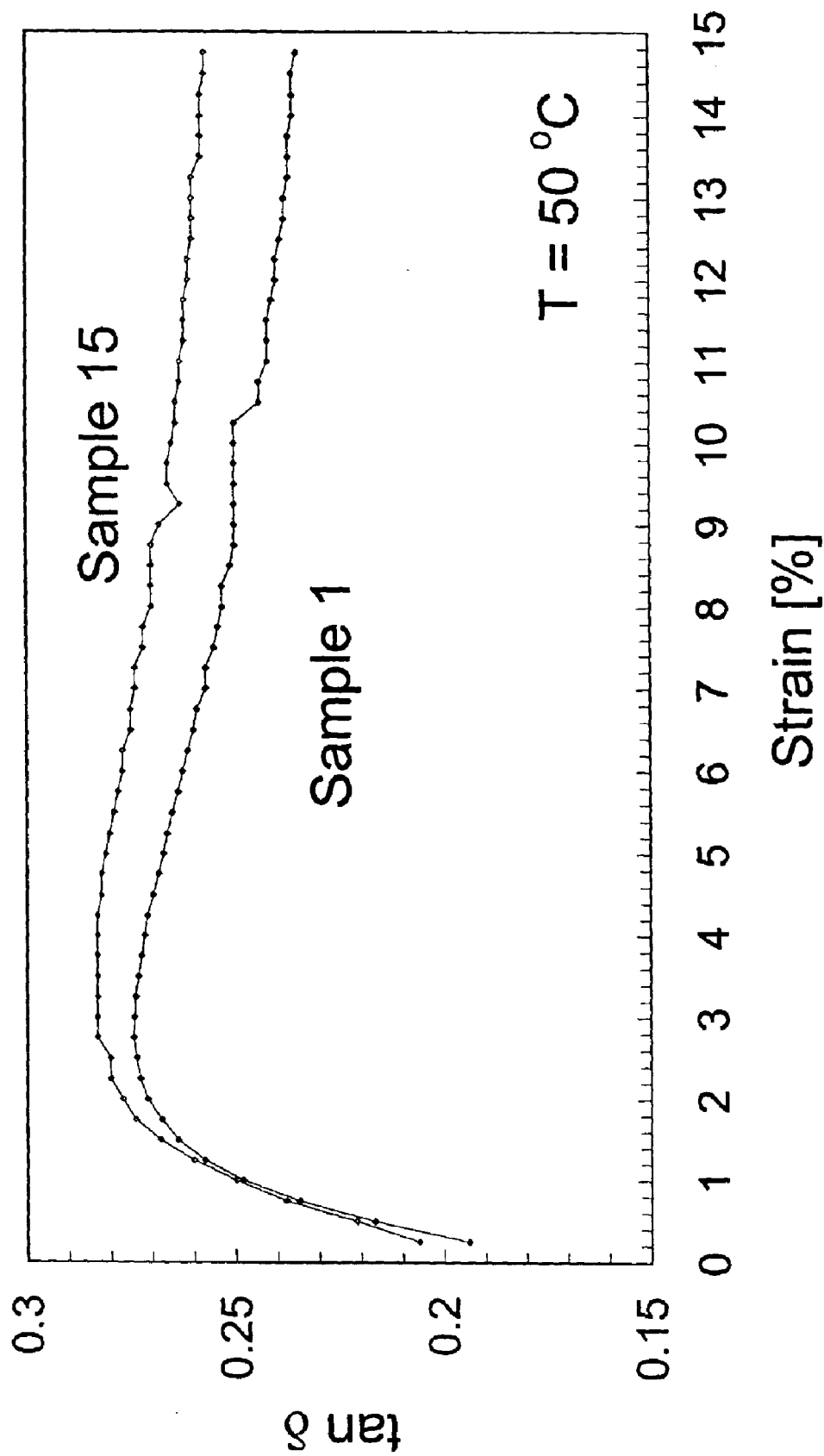
FIG. 2 is a graphical plot of the dynamic moduli sweep of a vulcanizate that was compounded with a comb-branched polymer and compared to a control vulcanizate.

The cured samples were analyzed for tensile properties according to ASTM D412 at 23° C. These results are provided in Table IV along with dynamic moduli data. The dynamic moduli sweeps for Samples 10 and 15 are shown in FIG. 2. Although the compound $T_g$ has declined by incorporation of the comb-branched polymer, the hysteresis of the material, particularly at higher strains and temperatures, is increased. This is opposite to standard practice whereby increasing $T_g$, one would attempt to increase hysteresis and visa versa.

TABLE IV

| Sample | Compound $T_g$ | Tan δ (0 C., 0.5/10% Strain) | Tan δ (25 C., 0.5% Strain) | Tan δ (50 C., 0.5/10% Strain) | Tan δ (75 C., 0.5% Strain) | Modulus (100%) [psi] | Modulus (300%) [psi] | Modulus at Break [psi] | Elongation at Break (%) |
|---|---|---|---|---|---|---|---|---|---|
| 10 | −17.5 | 0.49/0.54 | 0.25 | 0.24/0.25 | 0.23 | 284 | 929 | 1841 | 568 |
| 11 | −17.2 | 0.50/0.54 | 0.26 | 0.27/0.25 | 0.25 | 322 | 1002 | 1796 | 539 |
| 12 | −17.0 | 0.49/0.54 | 0.27 | 0.27/0.26 | 0.25 | 306 | 936 | 1625 | 517 |
| 13 | −16.5 | 0.50/0.56 | 0.27 | 0.28/0.26 | 0.26 | 349 | 1047 | 1705 | 500 |
| 14 | −16.1 | 0.50/0.56 | 0.27 | 0.27/0.27 | 0.26 | 340 | 997 | 1582 | 490 |
| 15 | −15.6 | 0.50/0.57 | 0.27 | 0.27/0.27 | 0.26 | 383 | 1182 | 1678 | 425 |

Various modifications and alterations that do not depart from the scope and spirit of this invention will become apparent to those skilled in the art. This invention is not to be duly limited to the illustrative embodiments set forth herein.

What is claimed is:

1. A vulcanizate comprising:
   a vulcanized rubber; and
   a comb-branched polymer that is prepared by preparing a mixture of living polymers that include living polymers with two living ends and living polymers with one living end to form a mixture of living polymers, and adding a coupling agent to the mixture of living polymers, where the coupling agent has at least three reactive functionalities.

2. The vulcanizate of claim 1, where the living polymers derive from conjugated diene monomers and, optionally, vinyl aromatic monomers.

3. The vulcanizate of claim 1, where the coupling agent has three reactive functionalities, and where after said step of adding a coupling agent, the molar ratio of living polymers with two living ends to living polymers with one living end to coupling agent is 0.5–1.5:0.5–1.5:0.5–1.5.

4. The vulcanizate of claim 1, where the coupling agent has four reactive functionalities, and where after said step of adding a coupling agent, the molar ratio of living polymers with two living ends to living polymers with one living end to coupling agent is 0.5–1.5:1–4.0:0.5–1.5.

5. The vulcanizate of claim 1, where the mixture of living polymers is prepared in a solvent.

6. The vulcanizate of claim 1, where the living polymer with one living end has a molecular weight from about 0.25 to 10 times the entanglement molecular weight, and where the living polymer with two living ends has a molecular weight from about 0.25 to 20 times the entanglement molecular weight.

7. The vulcanizate of claim 1, where the living polymer with one living end has a molecular weight from about 1 to 3 times the entanglement molecular weight, and where the living polymer with two living ends has a molecular weight from about 1 to 5 times the entanglement molecular weight.

8. The vulcanizate of claim 1, where the comb-branched polymer is present in an amount from about 1 to about 300 parts by weight per 100 parts by weight rubber.

9. A comb-branched polymer prepared by a process comprising:
   preparing a mixture of living polymers that includes polymers having one living end and polymers having two living ends, and
   adding a coupling agent to the mixture, where the coupling agent has at least three reactive functionalities.

10. The polymer of claim 9, where the living polymers derive from conjugated diene monomers and, optionally, vinyl aromatic monomers.

11. The polymer of claim 9, where the coupling agent has three reactive functionalities, and where after said step of adding a coupling agent, the molar ratio of living polymers with two living ends to living polymers with one living end to coupling agent is 0.5–1.5:0.5–1.5:0.5–1.5.

12. The polymer of claim 9, where the coupling agent has four reactive functionalities, and where after said step of adding a coupling agent, the molar ratio of living polymers with two living ends to living polymers with one living end to coupling agent is 0.5–1.5:1–4.0:0.5–1.5.

13. The polymer of claim 9, where the mixture of living polymers is prepared in a solvent.

14. The polymer of claim 9, where the living polymer with one living end has a molecular weight from about 0.25 to 10 times the entanglement molecular weight, and where the living polymer with two living ends has a molecular weight from about 0.25 to 20 times the entanglement molecular weight.

15. The polymer of claim 9, where the living polymer with one living end has a molecular weight from about 1 to 3 times the entanglement molecular weight, and where the living polymer with two living ends has a molecular weight from about 1 to 5 times the entanglement molecular weight.

16. A method for making a comb-branched polymer, the method comprising:
   preparing a mixture of living polymers that include living polymers with two living ends and living polymers with one living end to form a mixture of living polymers, and
   adding a coupling agent to the mixture of living polymers, where the coupling agent has at least three reactive functionalities.

17. The method of claim 16, where the living polymers derive from conjugated diene monomers and, optionally, vinyl aromatic monomers.

18. The method of claim 16, where the coupling agent has three reactive functionalities, and where after said step of adding a coupling agent, the molar ratio of living polymers with two living ends to living polymers with one living end to coupling agent is 0.5–1.5:0.5–1.5:0.5–1.5.

19. The method of claim 16, where the mixture of living polymers is prepared in a solvent.

20. The method of claim 16, where the living polymer with one living end has a molecular weight from about 0.25 to 10 times the entanglement molecular weight, and where the living polymer with two living ends has a molecular weight from about 0.25 to 20 times the entanglement molecular weight.

21. A vulcanizate comprising:
   a vulcanized rubber; and
   a comb-branched polymer that is prepared by
   (i) providing a monofunctional anionic initiator, a di-functional anionic initiator, and monomer,
   (ii) allowing said monofunctional anionic initiator and said di-functional anionic initiator to polymerize said monomer to thereby provide a mixture of polymer anions with two living ends and one living end, and
   (iii) adding a coupling agent to the mixture of living polymer anions, where the coupling agent has at least three reactive functionalities.

* * * * *